July 5, 1960
R. E. WILLIAMS
2,944,193
ELECTRIC SYSTEM
Filed Jan. 23, 1958
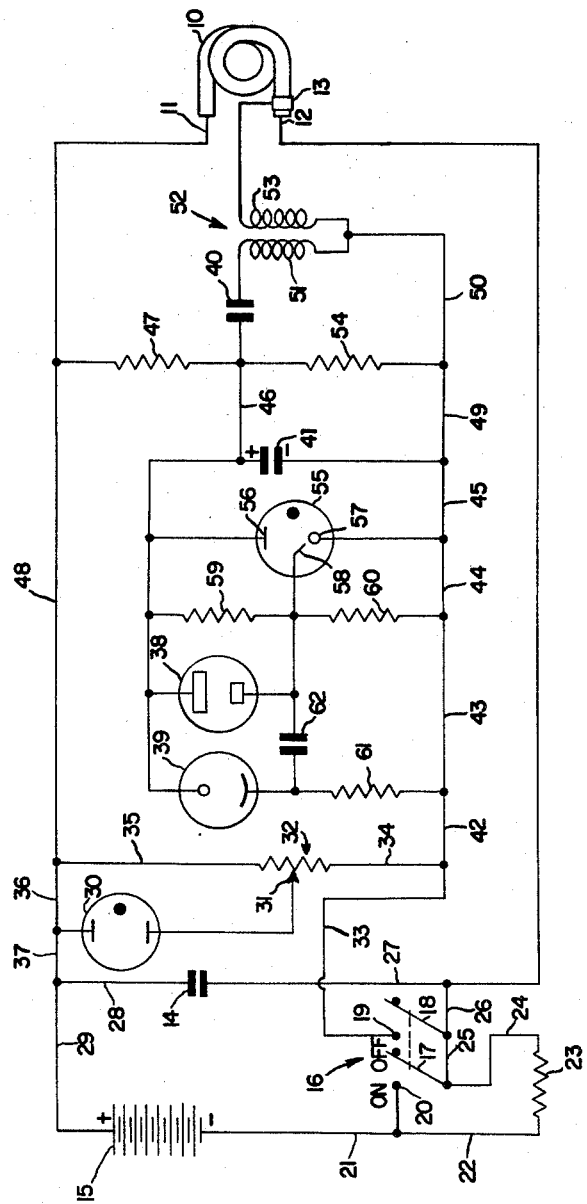
INVENTOR.
RICHARD E. WILLIAMS
BY
*Francis A Sirr*
ATTORNEY United States Patent Office 2,944,193
Patented July 5, 1960

2,944,193

ELECTRIC SYSTEM

Richard E. Williams, Denver, Colo., assignor to Minneapolis-Honeywell Regulator Company, Minneapolis, Minn., a corporation of Delaware Filed Jan. 23, 1958, Ser. No. 710,745

7 Claims. (Cl. 315—241)

This invention is concerned with an improved electric system and more particularly with an improved photographic flash system.

The present invention is concerned with an electric system of the photographic flash type in which electrical energy is transferred from a source of voltage to a capacitor and the capacitor is then selectively discharged such that the energy stored in this capacitor is dissipated in an illumination producing device to produce a brilliant flash of light to thereby illuminate a subject to be photographed. In apparatus of this type it is necessary to provide an indicator to indicate the state of charge of the capacitor. The amount of light produced by the source of illumination is of course dependent upon the quantity of energy which is stored in the capacitor at the time the capacitor is discharged into the source of illumination. The indicator is provided to indicate that a sufficient amount of energy has been stored in the capacitor to produce sufficient illumination for acceptable photography.

Furthermore, it is normal in apparatus of this type to provide an on-off switch which controls the connection from the source of voltage to the capacitor. Therefore, the photographer first places the switch in the on position and then observes the indicator to insure that he does not attempt the photographing of his subject until the indicator indicates that a sufficient quantity of energy has been transferred from the source of voltage to the capacitor. It is however inadvisable to leave the unit continuously in the on position since the capacitor does have an inherent leakage current and continues to drain energy from the source of voltage even after the capacitor is fully charged.

Furthermore, once the switch is placed in the off position it is inadvisable to attempt the use of the flash apparatus since, even though the capacitor may be somewhat charged at this time, the charge does tend to leak off and while it may be possible to produce a flash of light, the light will in all probability be of a lower intensity than necessary for good photography.

Therefore, it is an object of the present invention to provide an improved electric system of the photographic flash type wherein an indicator is controlled by switch means such that when the electric system is in the operative, or on, condition, the indicator is connected to the capacitor to indicate the state of charge of the capacitor, and upon the unit being placed in the inoperative, or off, position, the indicator is immediately disconnected from the capacitor and is de-energized to indicate that the apparatus is in the off position.

It is a further object of the present invention to provide an improved electronic photographic flash apparatus having a source of voltage, a capacitor, and an electronic flash tube, with the flash tube connected to the capacitor and arranged to be energized by the charge stored in the capacitor, and with switch means controlling the connection of the battery to the capacitor and also controlling the connection of a ready light to the capacitor to thereby indicate the state of charge of the capacitor and to immediately indicate that the apparatus has been placed in the off position once the switch means is actuated to the off position.

It is a further object of the present invention to provide an improved electronic photographic flash unit having a source of voltage, a capacitor, an electronic flash tube, and a triggering circuit, with the flash tube connected to the capacitor and arranged to be energized by the charge stored in the capacitor, and with on-off control means controlling the connection of an indicator and the triggering circuit to the capacitor and also controlling the connection of the capacitor to the source of voltage, the control means in one position causing the indicator to indicate the state of charge of the capacitor and to immediately indicate that the unit has been placed in the off position, the control means in the off position also disconnecting the triggering circuit from the capacitor.

These and other objects of the present invention will be apparent to those skilled in the art upon reference to the following specification, claims, and drawing, of which the single figure is a schematic representation of the present invention.

Referring to the single figure, the reference numeral 10 designates a source of illumination in the form of an electronic flash tube having a pair of main electrodes 11 and 12 and a triggering electrode 13. As is well known, it is a characteristic of a tube of this type to produce a brilliant flash of light when an electrical current of sufficient magnitude is passed therethrough, between the electrodes 11 and 12. The initiation of such a discharge through tube 10 is accomplished by a voltage being applied between the electrode 12 and the triggering electrode 13, as will be described.

The electrical energy to be dissipated in the tube 10 is derived from a high voltage electrolytic capacitor 14. In one modification, capacitor 14 consisted of a 1000 microfarad 225-volt capacitor. As can be seen, the upper plate of capacitor 14 is connected directly to the electrode 11 of the flash tube 10 and the lower plate of this capacitor is connected directly to the electrode 12 of this flash tube.

The electrical energy for operation of the system disclosed in the single figure is derived from the high voltage D.C. battery 15. The reference numeral 16 designates a control means in the form of a switch having switch blades 17 and 18 and contacts 19 and 20. The switch 16 is shown in the off position.

With the switch 16 in the off position, a very low magnitude current is provided by battery 15 to maintain the electrolytic capacitor 14 in the formed condition. This circuit can be traced from the lower terminal of battery 15 through conductors 21 and 22, resistor 23, conductor 24, conductors 25, 26 and 27, capacitor 14, and conductors 28 and 29 to battery 15. The resistor 23 is a very high magnitude resistor, for example 100 megohms. This construction, including the use of resistor 23 to prevent deforming of the electrolytic capacitor 14, is described more completely in the Stanley D. Eilenberger Patent 2,730,660.

When it is desired to place the apparatus in an operating condition, the switch means 16 is moved to the on position. The switch blade 17 then moves into engagement with contact 20 and substantially shunts resistor 23. This places the battery 15 directly in circuit with the capacitor 14 and electrical energy to charge capacitor 14 is transferred from battery 15. Furthermore, a ready light, or indicator, identified by the reference numeral 30, is connected across capacitor 14. This can be seen by tracing a circuit from the lower plate of capacitor 14 through conductor 26, switch blade 18 and contact 19, conductor 33, the resistance element of potentiometer 32, and conductors 35, 36 and 37 to the upper plate of capacitor 14. The potentiometer 32 therefore forms a voltage divider across capacitor 14 and the voltage impressed on the ready light 30 is therefore a portion of the voltage present on capacitor 14, as determined by the position of the wiper 31 of this potentiometer. The ready light or indicator 30 may be a neon bulb which fires when a given voltage is present on capacitor 14 and thereby indicates that sufficient electrical energy is stored in capacitor 14 to produce sufficient illumination for photography.

The photographer, observing that the ready light 30 is energized, is aware that the flash unit may be selectively energized to produce the flash of light. In the apparatus disclosed, means are provided to produce energization of the flash tube 10 either by means of the shutter contacts of a camera or by means of a photocell which is responsive to the energization of a master flash unit.

The reference numeral 38 designates an electrical outlet adapted to be connected by means of a shutter cord to the shutter contacts of a camera. As is well known, the shutter contacts of a camera are synchronized with the action of the camera shutter so that a switch is closed at the time that the shutter of the camera is fully opened. As will be explained, this completes a circuit to energize the flash tube 10 and produce a flash of light at the exact moment at which the camera shutter is completely open.

The reference numeral 39 designates a photoelectric cell which is responsive to light energy and particularly to a rapid change in intensity of light energy to cause the energy in capacitor 14 to be dissipated in the flash tube 10. This allows the disclosed apparatus to be used as a slave photographic flash unit which is responsive to a master flash unit. In this manner, the photographer may utilize the shutter contacts of his camera to actuate a master flash unit and the light produced by this master flash unit is sensed by the photocell 39 to cause the energy stored in capacitor 14 to be discharged through the flash tube 10.

Describing this more specifically, once the switch means 16 is placed in the on position, the capacitor 14 not only is charged but also electrical energy is transferred to capacitors 40, 41 and 62 which are in the triggering circuit for the flash tube 10. The charging circuit for capacitor 41 can be seen by tracing a circuit from the lower terminal of battery 15 through conductor 21, contact 20 and switch blade 17, conductor 25, switch blade 18 and contact 19, conductors 33, 42, 43, 44 and 45, capacitor 41, conductor 46, resistor 47, and conductors 48, 36, 37 and 29 to the upper terminal of battery 15. This above-traced circuit places a charge on capacitor 41 of the polarity indicated.

The charging circuit for capacitor 40 can be seen by tracing a circuit from the lower terminal of battery 15 through conductor 21, contact 20 and switch blade 17, conductor 25, switch blade 18 and contact 19, conductors 33, 42, 43, 44, 45, 49 and 50, the primary winding 51 of a triggering transformer 52, capacitor 40, resistor 47, and conductors 48, 36, 37 and 29 to the upper terminal of battery 15.

A further resistor 54 is provided and this resistor, connected in series with resistor 47, provides a bleeder resistance network which is connected directly across the battery 15 and controls the voltage to which the capacitors 40 and 41 are charged.

The charging circuit for capacitor 62 can be seen by tracing a circuit from the lower terminal of battery 15 through conductor 21, contact 20 and switch blade 17, conductor 25, switch blade 18 and contact 19, conductors 33 and 42, resistor 61, capacitor 62, resistor 59, conductor 46, resistor 47, and conductors 48, 36, 37 and 29 to the upper terminal of battery 15.

The charged capacitor 41 is a source of operating voltage for a cold cathode glow discharge device 55 having an anode 56, a cathode 57, and a control electrode 58. A further voltage divider is provided across capacitor 41 in the form of the connected resistors 59 and 60. The control electrode 58 of the glow discharge device is connected to the terminal connecting resistor 59 to resistor 60 and therefore the relative magnitudes of resistors 59 and 60 determine the potential level of the control electrode 58. This potential level is such as to normally maintain the glow discharge device 55 in a non-conducting state.

However, upon the closing of the camera shutter contacts to complete a circuit bridging the electrical outlet 38, the control electrode 58 is directly connected to the anode 56 and therefore the potential level of this control electrode approaches that of the anode. This causes a glow discharge to occur between the cathode 57 and the control electrode 58 and this glow discharge rapidly spreads such that a glow discharge occurs between the cathode 57 and the anode 56. This in turn substantially immediately discharges capacitor 41 and likewise causes capacitor 40 to be discharged to produce a relatively high magnitude current pulse of short time duration through the primary 51 of the triggering transformer 52. This in turn causes a high voltage to be induced in the secondary winding 53 of this triggering transformer.

The high voltage induced in this secondary winding then causes a discharge to occur between the triggering electrode 13 and the main electrode 12 of the discharge device 10. This glow discharge quickly spreads such that a glow discharge occurs between the electrodes 11 and 12 to cause the electrical energy in capacitor 14 to be dissipated in the flash tube 10 to produce a brilliant flash of light. The above described events occur also when photocell 39 senses the operation of a master flash unit.

In actual practice, the photocell 39 may be removed from a socket provided in the apparatus such that the apparatus may then function only in connection with the shutter contacts of a camera.

From the above explanation, it can be seen that the indicator or ready light 30 is provided in a circuit such that the energization of this indicator informs the photographer that capacitor 14 is charged to a sufficient extent to produce adequate illumination at the flash tube 10.

The photographer of course may utilize the flash tube 10 as many times as desired, always observing that the indicator 30 is energized before attempting to initiate the discharge of capacitor 14 through the flash tube 10.

From the above description, it can also be seen that the present invention provides an improved construction wherein the indicator 30 is not permanently connected across capacitor 14 but rather is connected across this capacitor only when the switch 16 is in the on position. As has been mentioned, the indicator 30 may be in the form of a neon bulb. This neon bulb has a given firing voltage and will remain energized even through the voltage applied to the neon bulb subsequently drops substantially below this firing voltage. Therefore, if the indicator 30 were permanently connected across the capacitor 14, it would be possible to disconnect the capacitor 14 from the battery 15 and for the indicator 30 to remain energized to thereby indicate that sufficient energy was stored in capacitor 14 to produce sufficient illumination at the flash tube. In actual practice, however, the charge on capacitor 14 slowly leaks off and the photographer in the event would be misled into believing that adequate illumination would be produced for good photography.

The apparatus of the present invention overcomes this difficulty by providing the improved construction, above described, whereby the switch blade 18 and the contact 19 are disengaged upon the switch means 16 being moved to the off position to thereby disconnect the indicator 30 from the capacitor 14. This insures that the indicator 30 is immediately deenergized once the switch means 16 is placed in the off position, independent of the actual state of charge of the capacitor 14. In this manner, the indicator 30 performs the dual function of indicating the state of charge of capacitor 14 when the switch means 16 is in the on position and secondly indicating that the apparatus has been placed in the off condition, this latter function being independent of the actual charge on capacitor 14.

In this manner, the photographer can place complete reliance on the indicator 30 since this indicator is energized only when the capacitor 14 has sufficient energy stored therein to produce sufficient illumination at the flash tube 10.

Switch means 16 perform an additional function to that above described, as is apparent from the above traced circuits. It will be remembered that the triggering circuit, including capacitors 40, 41 and 62, is energized upon switch means 16 being closed. This allows the flash tube 10 to be triggered to produce a flash of light. When using the apparatus of the present invention as a sleeve unit, that is operating by means of photo cell 39, the photographer may expose a number of pictures, using a master flash unit to energize flash tube 10. If it is then desired to use only the master flash unit as the source of light, the photographer moves switch means 16 to the off position. As above described, the indicator or ready light 30 is immediately deenergized, indicating that switch means 16 is in the off position. However, switch blade 18 in disengaging contact 19 disconnects the triggering circuit from the capacitor 14 and thereby insures that the master flash unit will not operate flash tube 10 since the charge on capacitor 40, 41, and 62 is very soon dissipated and the triggering circuit is then rendered inoperative.

The apparatus disclosed in this single figure has been constructed having the following components:

| | |
|---|---|
| Battery 15 | 240 volts. |
| Photocell 39 | 5653 phototube. |
| Discharge device 55 | 5328 glow discharge tube. |
| Resistor 23 | 100 megohms. |
| Resistor 60 | 22 megohms. |
| Resistor 61 | 22 megohms. |
| Resistor 59 | 56 megohms. |
| Resistor 47 | 500K ohms. |
| Resistor 54 | 3 megohms. |
| Potentiometer 32 | 2 megohms. |
| Capacitor 14 | 1000 microfarads. |
| Capacitor 62 | .001 microfarad. |
| Capacitor 41 | .5 microfarad. |
| Capacitor 40 | .25 microfarad. |

Other modifications of the present invention will be apparent to those skilled in the art and it is intended that the scope of the present invention be limited solely by the scope of the appended claims.

I claim as my invention:

1. An electronic flash illumination system, comprising; an electronic flash tube, a capacitor, circuit means connecting said capacitor to said flash tube such that the discharging of said capacitor through said flash tube produces a brilliant flash of light, a source of voltage, switch means, a ready light, and circuit means controlled by said switch means in a first position connecting said source of voltage and said ready light to said capacitor to thereby charge said capacitor and energize said ready light as an indication of the state of charge of said capacitor, said switch means when in a second position disconnecting said source of voltage and said ready light from said capacitor to thereby immediately deenergize said ready light independent of the state of charge of said capacitor.

2. An electronic photographic flash apparatus comprising: a high voltage capacitor, a high voltage electronic flash tube, circuit means connecting said flash tube to said capacitor such that said capacitor may be discharged through said flash tube to produce a brilliant flash of light, a high voltage source for charging said capacitor, an on-off switch, circuit means controlled by said switch in said on position connecting said high voltage source to charge said capacitor, a ready light, and circuit means controlled by said switch in said on position connecting said ready light to said capacitor so that illumination of said ready light indicates a given condition of charge of said capacitor, said last named circuit means also functioning when said switch is in said off position to disconnect said ready light from said capacitor and thereby cause said ready light to be immediately deenergized, independent of the state of charge of said capacitor.

3. An electronic photographic flash system comprising; a capacitor, an electronic flash tube having a pair of main electrodes connected to said capacitor, a triggering electrode for said flash tube, means connected to said triggering electrode to selectively cause said capacitor to be discharged through said flash tube to produce a brilliant flash of light, the intensity of said flash of light being dependent upon the charge on said capacitor at the time of initiating of said flash of light, a source of voltage, two position switch means, circuit means controlled by said switch means in a first position connecting said capacitor to said source of voltage, a neon ready light having an initial firing voltage and having an extinction voltage which is appreciably lower than said firing voltage, circuit means controlled by said switch means in said first position connecting said ready light to said capacitor to thereby cause said ready light to initially fire only upon said capacitor being charged sufficiently to produce a given intensity of light at said flash tube, said switch means in the second position disconnecting said battery from said capacitor and disconnecting said ready light from said capacitor to thereby cause said ready light to be immediately extinguished independent of the state of charge of said capacitor.

4. Photographic flash apparatus, comprising; a photographic flash illumination source, a capacitor, means including a circuit interconnecting said illumination source and said capacitor to selectively cause the energy stored in said capacitor to be dissipated at said illumination source and thereby produce a brilliant flash of light, a source of voltage for charging said capacitor, control means having a first condition in which said source of voltage is operatively connected to said capacitor and having a second position in which said source of voltage is operatively disconnected from said capacitor, a neon bulb having a high firing voltage and having an appreciably lower extinction voltage, and further means controlled by said control means in said first condition operatively connecting said neon bulb to said capacitor to cause said neon bulb to fire when said capacitor has been charged to a voltage sufficient to insure that a given quantity of illumination will be produced at said illumination source, said control means in a second condition operatively disconnecting said neon bulb from said capacitor to immediately extinguish said neon bulb and thereby indicate that said capacitor is no longer being maintained in a charged condition by said source of voltage.

5. Photographic flash apparatus, comprising; a photographic flash source of illumination capable of electrical energization, a capacitor capable of storing electrical energy, means including a circuit interconnecting said source of illumination and said capacitor to enable selective energization of said source of illumination as the electrical energy stored in said capacitor is dissipated in said source of illumination, a source of voltage, control means having a first and a second condition of operation, circuit means controlled by said control means in said first condition of operation operatively connecting said source of voltage to said capacitor to thereby cause electrical energy to be stored in said capacitor, electrically energizable indicator means, further circuit means controlled by said control means in said first condition connecting said indicator means to said capacitor to indicate a condition wherein a given quantity of electrical energy is stored in said capacitor to produce a brilliant flash of light when said given quantity of energy is dissipated in said source of illumination, said control means in said second condition of operation operatively disconnecting said source of voltage from said capacitor and operatively disconnecting said indicator means from said capacitor to thereby immediately indicate that said capacitor is no longer being held in a charged condition by said source of voltage.

6. An electronic flash illumination apparatus, comprising; an electronic flash tube having a pair of main electrodes and a trigger electrode, a source of voltage, a capacitor connected to said source of voltage to be charged therefrom, circuit means connecting said capacitor to the main electrodes of said flash tube, a triggering circuit connected to the trigger electrode of said flash tube and selectively operable to cause energization of said flash tube, control means having a first and a second operative condition, and circuit means controlled by said control means in said first operative condition connecting said triggering circuit to said capacitor to render said triggering circuit operative, said control means in said second operative condition rendering said triggering circuit inoperative to prevent energization of said flash tube.

7. An electronic flash illumination apparatus, comprising; an electronic flash tube having a pair of main electrodes and a trigger electrode, a capacitor, circuit means connecting said capacitor to the main electrodes of said flash tube such that the energization of said flash tube causes the discharge of said capacitor through said flash tube to produce a flash of light, a triggering circuit, circuit means connecting said triggering circuit to said trigger electrode to cause selective energization of said flash tube; a source of voltage, on-off switch means, indicator means, circuit means controlled by said switch means in the on position connecting said source of voltage and said indicator means to said capacitor to thereby charge said capacitor and energize said indicator means to indicate the state of charge of said capacitor, and further circuit means controlled by said switch means in the on position connecting said triggering circuit to said source of voltage to thereby render said triggering circuit operative; said switch means in the off position disconnecting said source of voltage and said indicator means from said capacitor to thereby immediately deenergize said indicator means independent of the state of charge of said capacitor to indicate that said switch means is in the off position, said switch means in the off position also disconnecting said triggering circuit from said source of voltage to thereby render said triggering circuit inoperative.

References Cited in the file of this patent

UNITED STATES PATENTS

| | | |
|---|---|---|
| 2,447,832 | Abend | Aug. 24, 1948 |
| 2,622,229 | Lord | Dec. 16, 1952 |
| 2,624,831 | Farber | Jan. 6, 1953 |
| 2,721,959 | Nessel | Oct. 25, 1955 |

FOREIGN PATENTS

| | | |
|---|---|---|
| 750,224 | Great Britain | June 13, 1956 |
| 856,997 | Germany | Nov. 27, 1952 |